US010823066B2

(12) United States Patent
Miller et al.

(10) Patent No.: US 10,823,066 B2
(45) Date of Patent: Nov. 3, 2020

(54) THERMAL MANAGEMENT SYSTEM (71) Applicant: General Electric Company, Schenectady, NY (US)

(72) Inventors: Brandon Wayne Miller, Liberty Township, OH (US); Christopher James Kroger, West Chester, OH (US); Matthew Robert Cerny, West Chester, OH (US)

(73) Assignee: General Electric Company, Schenectady, NY (US)

( * ) Notice: Subject to any disclaimer, the term of this patent is extended or adjusted under 35 U.S.C. 154(b) by 859 days.

(21) Appl. No.: 14/963,419

(22) Filed: Dec. 9, 2015

(65) Prior Publication Data

US 2017/0167382 A1 Jun. 15, 2017

(51) Int. Cl.
*F02C 7/14* (2006.01)
*B64D 15/06* (2006.01)
(Continued)

(52) U.S. Cl.
CPC ............... *F02C 7/14* (2013.01); *B64D 15/06* (2013.01); *B64D 33/02* (2013.01); *F01D 11/24* (2013.01);
(Continued)

(58) Field of Classification Search
CPC ... F02C 6/08; F02C 9/18; B64D 13/06; B64D 13/08
See application file for complete search history.

(56) References Cited

U.S. PATENT DOCUMENTS 2,582,842 A * 1/1952 Messinger ............. B64D 13/08
237/12.3 B
4,773,212 A 9/1988 Griffin et al.
(Continued)

FOREIGN PATENT DOCUMENTS

CN 101688477 A 3/2010
CN 102407944 A 4/2012
(Continued)

OTHER PUBLICATIONS

Extended European Search Report and Opinion issued in connection with corresponding EP Application No. 6201927.7 dated Apr. 11, 2017.
(Continued)

*Primary Examiner* — Craig Kim
(74) *Attorney, Agent, or Firm* — Dority & Manning, P.A.

(57) ABSTRACT

A thermal management system for a gas turbine engine and/or an aircraft is provided including a thermal transport bus having a heat exchange fluid flowing therethrough. The thermal management system also includes one or more heat source exchangers and a deicing module. The one or more heat source exchangers and the deicing module are each in thermal communication with the heat exchange fluid in the thermal transport bus. The one or more heat source exchangers are configured to transfer heat from one or more accessory systems to the heat exchange fluid, and the deicing module is located downstream of the one or more heat source exchangers for transferring heat from the thermal transfer fluid to a surface of one or more components of the gas turbine engine and/or the aircraft.

20 Claims, 5 Drawing Sheets

(51) Int. Cl.
*F02C 7/047* (2006.01)
*B64D 33/02* (2006.01)
*F01D 11/24* (2006.01)
*F02C 3/04* (2006.01)
*F02C 7/06* (2006.01)

(52) U.S. Cl.
CPC ............... *F02C 3/04* (2013.01); *F02C 7/047* (2013.01); *F02C 7/06* (2013.01); *B64D 2033/0233* (2013.01); *F05D 2220/32* (2013.01); *F05D 2260/20* (2013.01); *F05D 2260/213* (2013.01); *F05D 2260/98* (2013.01); *Y02T 50/676* (2013.01)

(56) References Cited

U.S. PATENT DOCUMENTS

| | | | |
|---|---|---|---|
| 5,667,168 A | 9/1997 | Fluegel | |
| 6,415,595 B1 * | 7/2002 | Wilmot, Jr. | B64D 13/006 60/266 |
| 6,701,717 B2 | 3/2004 | Flatman et al. | |
| 7,377,098 B2 | 5/2008 | Walker et al. | |
| 7,398,641 B2 | 7/2008 | Stretton et al. | |
| 7,478,525 B2 * | 1/2009 | Iya | F02K 1/822 60/204 |
| 7,810,332 B2 * | 10/2010 | Olmes | F02C 3/22 60/39.17 |
| 8,261,528 B2 | 9/2012 | Chillar et al. | |
| 8,424,285 B2 * | 4/2013 | Veilleux, Jr. | F01D 25/12 60/39.83 |
| 8,499,822 B2 * | 8/2013 | Bulin | F02C 7/14 165/41 |
| 9,284,057 B2 * | 3/2016 | Kelnhofer | B64D 13/06 |
| 9,328,661 B2 * | 5/2016 | Ho | F02C 7/00 |
| 9,429,072 B2 * | 8/2016 | Diaz | F02C 7/047 |
| 2012/0048509 A1 * | 3/2012 | Weber | B64D 15/04 165/63 |
| 2014/0205446 A1 | 7/2014 | Patsouris et al. | |
| 2014/0345292 A1 | 11/2014 | Diaz et al. | |

FOREIGN PATENT DOCUMENTS

| | | |
|---|---|---|
| EP | 3 018 304 A1 | 5/2016 |
| GB | 2136880 A | 9/1984 |
| GB | 2204361 A | 11/1988 |
| JP | 2001317371 A | 11/2001 |
| JP | 2010/522842 A | 7/2010 |
| WO | 02/16743 A1 | 2/2002 |
| WO | WO 2011/038188 A1 | 3/2011 |

OTHER PUBLICATIONS

Machine Translation and Notificaton of Reasons for Refusal issued in connection with corresponding JP Application No. 2016-236356 dated Dec. 26, 2017.

Office Action issued in connection with corresponding CA Application No. 2950782 dated Jan. 17, 2018.

Machine Translation and First Office Action and Search issued in connection with corresponding CN Application No. 201611128507.0 dated Feb. 14, 2018.

Chinese Search Report Corresponding to Application No. 201611128507 dated Jan. 11, 2018.

Machine Translated Japanese Office Action Corresponding to Application No. 2016236356 dated Aug. 14, 2018.

* cited by examiner

THERMAL MANAGEMENT SYSTEM

FIELD OF THE INVENTION

The present subject matter relates generally to a thermal management system having a surface heat exchange module for incorporation into an airplane and/or an engine.

BACKGROUND OF THE INVENTION

Gas turbine engines typically include an inlet, a fan, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator.

When the engines operate in icing conditions, e.g., exposed to clouds of super-cooled water droplets, ice may accumulate on exposed engine structures. More specifically, if engines are operated within icing conditions for extended periods of time, ice accumulation within the engine and over exposed engine structures may be significant. Over time, continued operation of the engine, a throttle burst from lower power operations to higher power operations, and/or vibrations due to either turbulence or asymmetry of ice accretion, may cause the accumulated ice build-up to be ingested by the one or more compressors. Such a condition, known as an ice shed, may cause certain problems within the gas turbine engine.

To facilitate preventing ice accretion within the engine and over exposed surfaces adjacent the engine, at least some known engines include a de-icing system. Deicing systems typically utilize bleed air from the one or more compressors to provide heat to the desired surfaces. Pipes are provided to transport the bleed air to the desired location. However, the pipes can be relatively large making it difficult to package the deicing system, and further the pipes can be relatively heavy, which may detrimentally affecting fuel burn for the engine.

Accordingly, a deicing system that does not rely on bleed air would be useful. More particularly, a deicing system that does not require pipes for ducting bleed air to one or more surfaces requiring deicing would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure a thermal management system for incorporation at least partially into at least one of a gas turbine engine or an aircraft is provided. The thermal management system includes a thermal transport bus having a heat exchange fluid flowing therethrough and a pump for generating a flow of the heat exchange fluid in the thermal transport bus. The thermal management system additionally includes one or more heat source exchangers in thermal communication with the heat exchange fluid in the thermal transport bus, and a surface heat exchange module. The deicing module is in thermal communication with the heat exchange fluid in the thermal transport bus at a location downstream of the one or more heat source exchangers for transferring heat from the thermal transfer fluid to a surface of one or more components of the gas turbine engine or the aircraft.

In another exemplary embodiment of the present disclosure, a gas turbine engine is provided. The gas turbine engine includes a compressor section coupled to a turbine section by one or more shafts, and a main lubrication system for providing lubrication to one or more components located in at least one of the compressor section or the turbine section. The gas turbine engine also includes a thermal management system. The thermal management system includes a thermal transport bus having a heat exchange fluid flowing therethrough, and a pump for generating a flow of the heat exchange fluid in the thermal transport bus. The thermal management system also includes one or more heat source exchangers in thermal communication with the heat exchange fluid in the thermal transport bus, the one or more source exchangers including a main lubrication heat exchanger in thermal communication with the main lubrication system. The thermal management system also includes a surface heat exchange module in thermal communication with the heat exchange fluid in the thermal transport bus at a location downstream of the one or more heat source exchangers for transferring heat from the thermal transfer fluid to a surface of one or more components of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
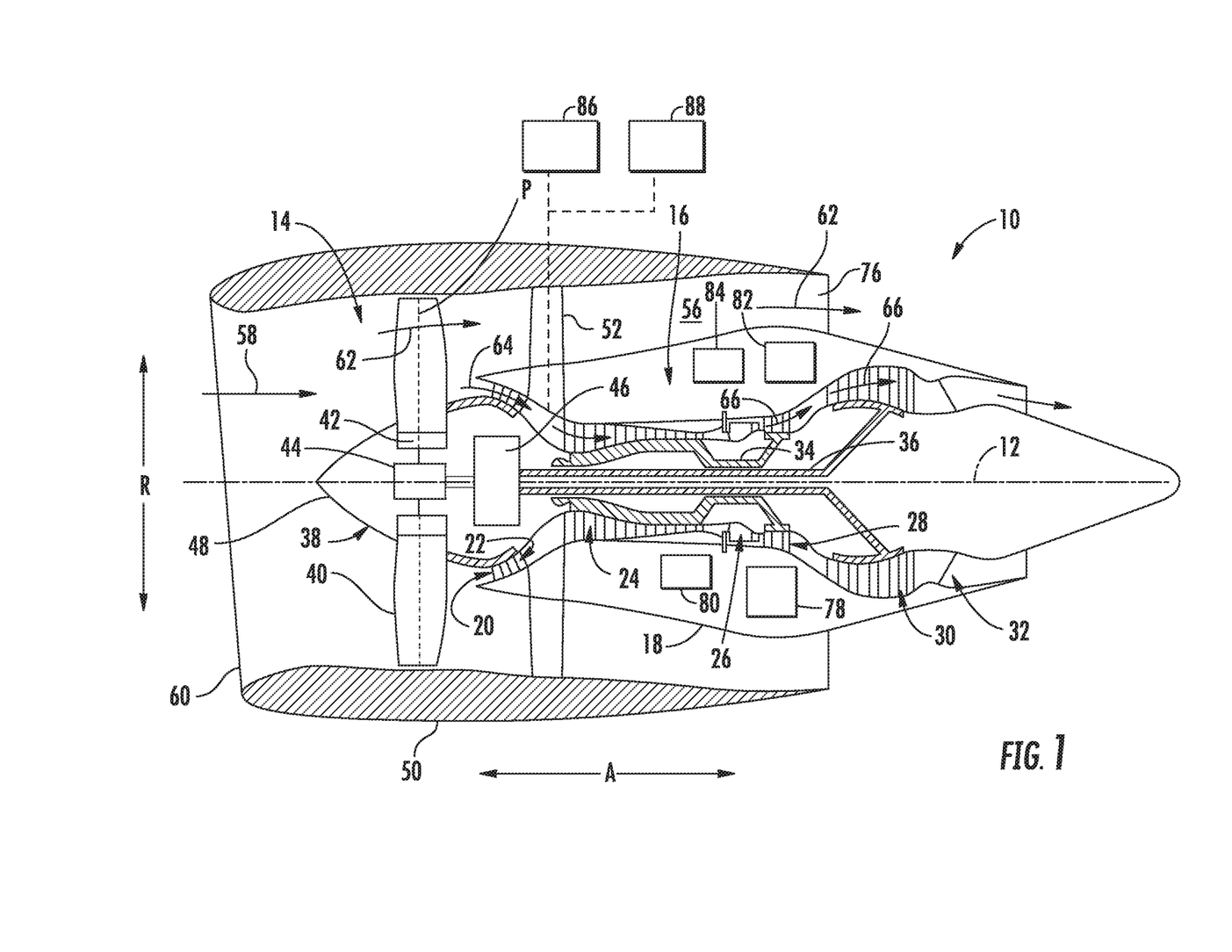
FIG. 1 is a schematic, cross-sectional view of an exemplary gas turbine engine according to various embodiments of the present subject matter.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The nacelle 50 is supported relative to the core turbine engine 16 by a plurality of circumferentially-spaced outlet guide vanes 52. Moreover, the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Figure 3:
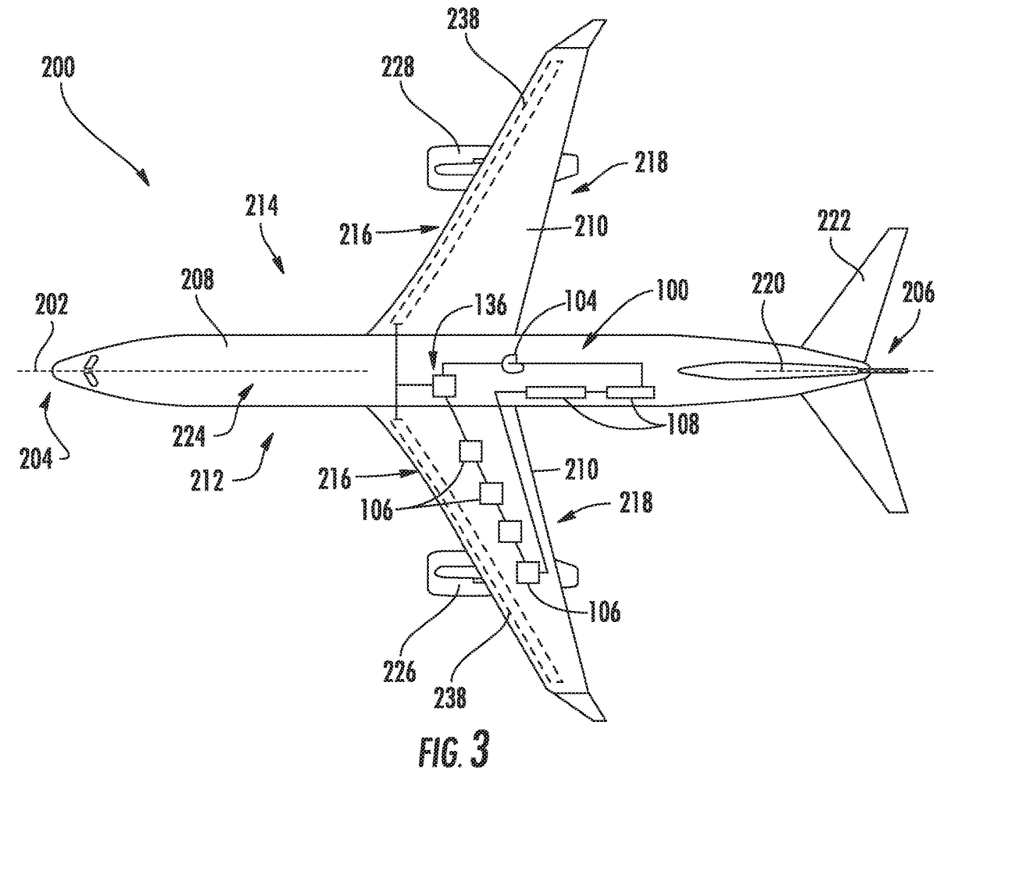
FIG. 3 is a simplified schematic view of a thermal management system in accordance with another exemplary embodiment of the present disclosure.

Moreover, as is depicted schematically, the exemplary turbofan engine 10 further includes various accessory systems to aid in the operation of the turbofan engine 10 and/or an aircraft including the turbofan engine 10 (e.g., FIG. 3). For example, the exemplary turbofan engine 10 further includes a main lubrication system 78 configured to provide a lubricant to, e.g., various bearings and gear meshes in the compressor section (including the LP compressor 22 and HP compressor 24), the turbine section (including the HP turbine 28 and the LP turbine 30), the HP spool 34, the LP spool 36, and the power gear box 46. The lubricant provided by the main lubrication system 78 may increase the useful life of such components and may remove a certain amount of heat from such components. Additionally, the turbofan engine 10 includes a compressor cooling air (CCA) system 80 for providing air from one or both of the HP compressor 24 or LP compressor 22 to one or both of the HP turbine 28 or LP turbine 30. Moreover, the exemplary turbofan engine 10 includes an active thermal clearance control (ACC) system 82 for cooling a casing of the turbine section to maintain a clearance between the various turbine rotor blades and the turbine casing within a desired range throughout various engine operating conditions. Furthermore, the exemplary turbofan engine 10 includes a generator lubrication system 84 for providing lubrication to an electronic generator, as well as cooling/heat removal for the electronic generator. The electronic generator may provide electrical power to, e.g., a startup electric motor for the turbofan engine 10 and/or various other electronic components of the turbofan engine 10 and/or an aircraft including the turbofan engine 10.

As is also depicted schematically, the exemplary turbofan engine 10 drives or enables various other accessory systems, e.g., for an aircraft (such as the aircraft 200 described below with reference to FIG. 3) including the exemplary turbofan engine 10. For example, the exemplary turbofan engine 10 provides compressed air from the compressor section to an environmental control system (ECS) 86. The ECS 86 may provide an air supply to a cabin of the aircraft for pressurization and thermal control. Additionally, air may be provided from the exemplary turbofan engine 10 to an electronics cooling system 88 for maintaining a temperature of certain electronic components of the turbofan engine 10 and/or aircraft within a desired range.

Prior turbofan engines 10 and/or aircrafts included individual heat exchangers for each of these accessory systems to remove heat from air and/or lubrication in such systems. However, aspects of the present disclosure include a thermal management system 100 (see FIG. 2) for transferring heat from some or all of such accessory systems to more efficiently remove such heat and/or utilize such heat.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the exemplary turbofan engine 10 may include or be operably connected to any other suitable accessory systems. Additionally, or alternatively, the exemplary turbofan engine 10 may not include or be operably connected to one or more of the accessory systems discussed above.

Figure 2:
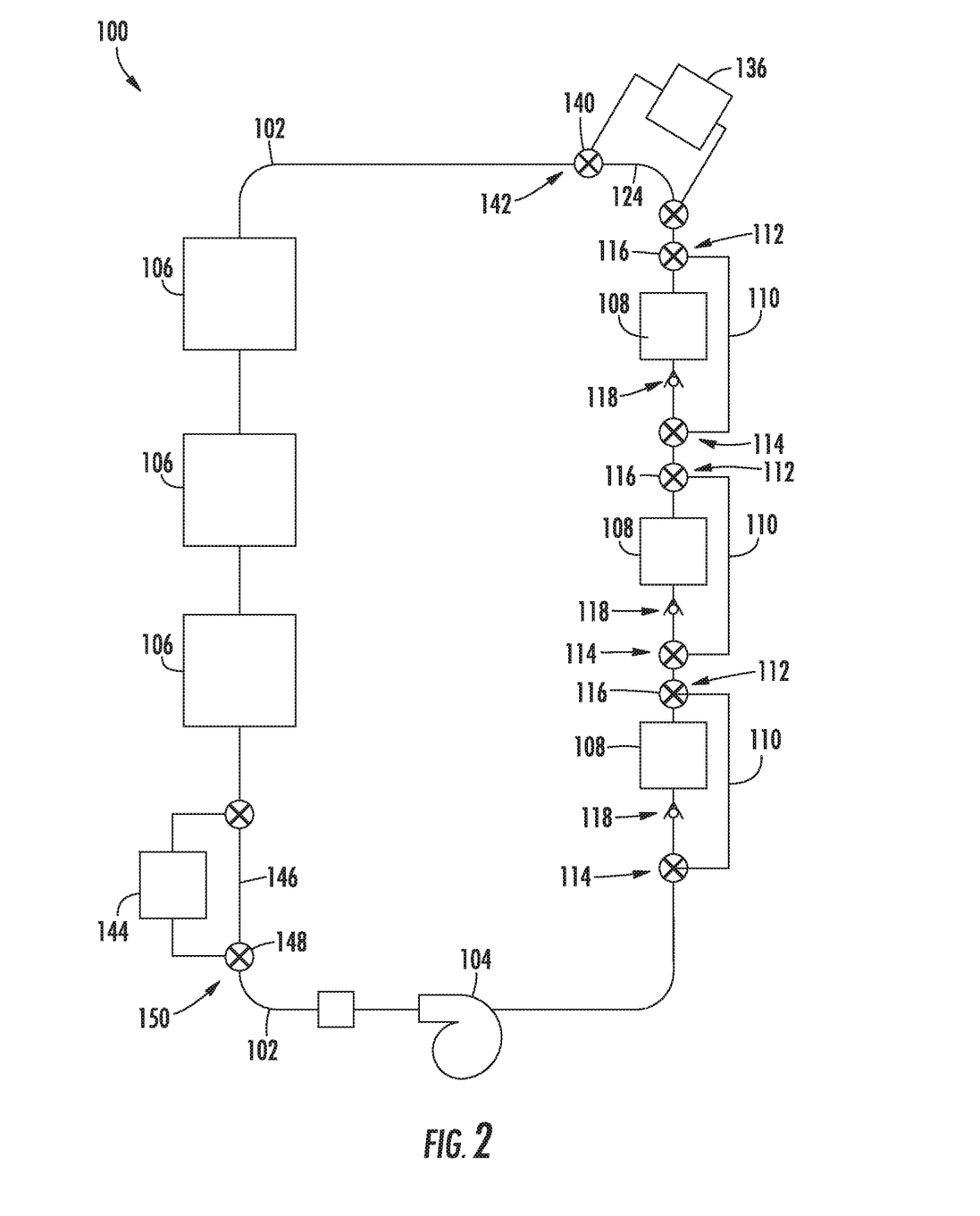
FIG. 2 is a simplified schematic view of a thermal management system in accordance with an exemplary embodiment of the present disclosure.

Referring now to FIG. 2, a schematic, flow diagram is provided of a thermal management system 100 in accordance with an exemplary embodiment of the present disclosure for incorporation at least partially into the exemplary turbofan engine 10 of FIG. 1, the exemplary aircraft 200 of FIG. 3 (discussed below), and/or the exemplary aircraft 200 and engine 206 of FIGS. 4 and 5 (discussed below).

As shown, the thermal management system 100 generally includes a thermal transport bus 102. The thermal transport bus 102 includes an intermediary heat exchange fluid flowing therethrough and may be formed of one or more suitable fluid conduits. The heat exchange fluid may be an incompressible fluid having a high temperature operating range. For example, in certain embodiments, heat exchange fluid may be a water and ethanol mixture, or any suitable dielectric fluid. A pump 104 is provided in fluid communication with the heat exchange fluid in the thermal transport bus 102 for generating a flow of the heat exchange fluid in/through the thermal transport bus 102. As viewed in FIG. 2, the pump 104 may generate a flow of the heat exchange fluid generally in a clockwise direction through the thermal transport bus 102. The pump 104 may be a rotary pump including an impeller, or alternatively may be any other suitable fluid pump. Additionally, the pump 104 may be powered by an electric motor, or alternatively may be in mechanical communication with and powered by, e.g., the HP shaft 34 or the LP shaft 36 of the turbofan engine 10. In still other embodiments, the pump 104 may be powered by an auxiliary turbine, which in turn may be powered by bleed air from a compressor section of a gas turbine engine within which the system 100 is incorporated.

Moreover, the exemplary thermal management system 100 includes a one or more heat source exchangers 106 in thermal communication with the heat exchange fluid in the thermal transport bus 102. Specifically, the thermal management system 100 depicted includes a plurality of heat source exchangers 106. The plurality of heat source exchangers 106 are configured to transfer heat from one or more of the accessory systems of the turbofan engine 10 (or in operable communication with the turbofan engine 10) to the heat exchange fluid in the thermal transport bus 102. For example, in certain exemplary embodiments, the plurality of heat source exchangers 106 may include one or more of: a main lubrication system heat exchanger for transferring heat from the main lubrication system 78; a CCA system heat source exchanger for transferring heat from the CCA system 80; an ACC system heat source exchanger for transferring heat from the ACC system 82; a generator lubrication system heat source exchanger for transferring heat from the generator lubrication system 84; an ECS heat exchanger for transferring heat from the ECS 86; an electronics cooling system heat exchanger for transferring heat from the electronics cooling system 88; a vapor compression system heat exchanger; an air cycle system heat exchanger; and an auxiliary system(s) heat source exchanger. By way of example, the auxiliary system(s) heat source exchanger may be configured to transfer heat from one or more of a radar system, a defense system, passenger entertainment systems, etc. Accordingly, a thermal management system 100 in accordance with an exemplary embodiment of FIG. 2 may transfer heat from a variety of independent systems to the heat exchange fluid in the thermal transport bus 102 for removal.

For the embodiment depicted, there are three heat source exchangers 106, the three heat source exchangers 106 each arranged in series flow along the thermal transport bus 102. However, in other exemplary embodiments, any other suitable number of heat source exchangers 106 may be included and one or more of the heat source exchangers 106 may be arranged in parallel flow along the thermal transport bus 102. For example, in other embodiments, there may be a single heat source exchanger 106 in thermal communication with the heat exchange fluid in the thermal transport bus, or alternatively, there may be at least two heat source exchangers 106, least four heat source exchangers 106, at least five heat source exchangers 106, or at least six heat source exchangers 106 in thermal communication with heat exchange fluid in the thermal transport bus 102.

Additionally, the exemplary thermal management system 100 of FIG. 2 further includes one or more heat sink exchanger 108 permanently or selectively in thermal communication with the heat exchange fluid in the thermal transport bus 102. The one or more heat sink exchangers 108 are located downstream of the plurality of heat source exchangers 106 and are configured for transferring heat from the heat exchange fluid in the thermal transport bus 102, e.g., to atmosphere, to fuel, to a fan stream, etc. For example, in certain embodiments the one or more heat sink exchangers 108 may include at least one of a RAM heat exchanger, a fuel heat exchanger, a fan stream heat exchanger, a bleed air heat exchanger, an engine intercooler, or a cold air output of am air cycle system. The RAM heat exchanger may be configured as an "air to heat exchange fluid" heat exchanger integrated into one or both of the turbofan engine 10 or an aircraft including the turbofan engine 10. During operation, the RAM heat exchanger may remove heat from any heat exchange fluid therein by flowing a certain amount of RAM air over the RAM heat exchanger. Additionally, the fuel heat exchanger is a "fluid to heat exchange fluid" heat exchanger wherein heat from the heat exchange fluid is transferred to a stream of liquid fuel for the turbofan engine 10. Moreover, the fan stream heat exchanger is generally an "air to heat exchange fluid" heat exchanger which flows, e.g., bypass air over heat exchange fluid to remove heat from the heat exchange fluid. Further, the bleed air heat exchanger is generally an "air to heat exchange fluid" heat exchanger which flows, e.g., bleed air from the LP compressor over heat exchange fluid to remove heat from the heat exchange fluid.

For the embodiment of FIG. 2, the one or more heat sink exchangers 108 of the thermal management system 100 depicted includes a plurality of individual heat sink exchangers 108. More particularly, for the embodiment of FIG. 2, the one or more heat sink exchangers 108 include three heat sink exchangers 108 arranged in series. The three heat sink exchangers 108 are configured as a RAM heat exchanger, a fuel heat exchanger, and a fan stream heat exchanger. However, in other exemplary embodiments, the one or more heat sink exchangers 108 may include any other suitable number of heat sink exchangers 108. For example, in other exemplary embodiments, a single heat sink exchanger 108 may be provided, at least two heat sink exchangers 108 may be provided, at least four heat sink exchangers 108 may be provided, or at least five heat sink exchangers 108 may be provided. Additionally, in still other exemplary embodiments, two or more of the one or more heat sink exchangers 108 may alternatively be arranged in parallel flow with one another.

Referring still to the exemplary embodiment depicted in FIG. 2, the plurality of heat sink exchangers 108 are selectively in thermal communication with the heat exchange fluid in the thermal transport bus 102. More particularly, the thermal management system 100 depicted includes a plurality of bypass lines 110 for selectively bypassing each heat sink exchanger 108 in the plurality of heat sink exchangers 108. Each bypass line 110 extends between an upstream juncture 112 and a downstream juncture 114 the upstream juncture 112 located just upstream of a respective heat sink exchanger 108, and the downstream juncture 114 located just downstream of the respective heat sink exchanger 108. Additionally, each bypass line 110 meets at the respective upstream juncture 112 with the thermal transport bus 102 via a three-way heat sink valve 116. The three-way heat sink valves 116 each include an inlet fluidly connected with the thermal transport bus 102, a first outlet fluidly connected with the thermal transport bus 102, and a second outlet fluidly connected with the bypass line 110. The three-way heat sink valves 116 may each be a variable throughput three-way valve, such that the three-way heat sink valves 116 may vary a throughput from the inlet to the first and/or second outlets. For example, the three-way heat sink valves 116 may be configured for providing anywhere between zero percent (0%) and one hundred percent (100%) of the heat exchange fluid from the inlet to the first outlet, and similarly, the three-way heat sink valves 116 may be configured for providing anywhere between zero percent (0%) and one hundred percent (100%) of the heat exchange fluid from the inlet to the second outlet.

Notably, the three-way heat sink valves 116 may be in operable communication with a controller of the turbofan engine 10 and/or of an aircraft including the turbofan engine 10. The controller may bypass one or more of the one or more heat sink exchangers 108 based on, e.g., an operating condition of the turbofan engine 10 and/or aircraft, a temperature of the heat exchange fluid, and/or any other suitable variables. Alternatively, the controller may bypass one or more of the one or more heat sink exchangers 108 based on a user input.

Further, each bypass line 110 also meets at the respective downstream juncture 114 with the thermal transport bus 102. Between each heat sink exchanger 108 and downstream juncture 114, the thermal transport bus 102 includes a check valve 118 for ensuring a proper flow direction of the heat exchange fluid. More particularly, the check valve 118 prevents a flow of heat exchange fluid from the downstream juncture 114 towards the respective heat sink exchanger 108.

The thermal management system 100 of FIG. 2 may more efficiently remove heat from the various accessory systems of the turbofan engine 10 and/or the aircraft. For example, the various accessory systems may generate a varying amount of heat dependent on various operating conditions of the turbofan engine 10 and/or the aircraft. However, not all of the accessory systems define the same heat pattern (i.e., not all of the accessory systems heat up and cool down at the same time). For example, the main lubrication system 78 may require a maximum amount of heat removal during high load conditions of the turbofan engine 10. By contrast, however, the ECS 86 may require a max amount of heat removal during high-altitude flight. Accordingly, by integrating the heat removal for the variety of different accessory systems, less heat exchangers may be required to remove a desired amount of heat and/or smaller heat exchangers may be required to remove a desired amount of heat.

Moreover, due to the configuration of the various heat sink exchangers 108 (and/or a surface heat exchange module 136, discussed below) being in selective thermal communication with the heat exchange fluid in the thermal transport bus 102, heat may be removed from the various accessory systems in a more efficient manner. For example, when a relatively low amount of heat is required to be removed from the heat exchange fluid, the most efficient heat sink exchanger 108 (and/or the surface heat exchange module 136, discussed below) may be utilized and the others bypassed. However, when a relatively high amount of heat is required to be removed from the heat exchange fluid, the additional heat sink exchangers 108 (and/or the surface heat exchange module 136, discussed below) may also be utilized.

Furthermore, in the exemplary embodiments including a plurality of heat sink exchangers 108 (and/or the surface heat exchange module 136, discussed below) having bypass capability, for example, the additional heat sink exchangers 108 (and/or the surface heat exchange module 136, discussed below) have the benefit of adding redundancy to the thermal management system 100. For example, in the event of a failure of one or more of the heat sink exchangers 108 or associated portions of the thermal transport bus 102, the heat exchange fluid may be routed around such failure and the system 100 may continue to provide at least some heat removal.

Referring still to FIG. 2, the exemplary thermal management system 100 depicted is configured to use a single phase, incompressible thermal transport fluid. It should be appreciated, however, that in other embodiments, the thermal management system 100 may instead use a phase change fluid. With such an embodiment, the thermal management system 100 may include a compressor for compressing the heat exchange fluid in the thermal transport bus 102, and an expansion device for expanding the heat exchange fluid in the thermal transport bus 102. The compressor may be selectively in fluid communication with the heat exchange fluid at a location downstream of the heat source exchangers 106 and upstream of the one or more heat sink exchangers 108. By contrast, the expansion device may be selectively in fluid communication with the heat exchange fluid at a location downstream of the one or more heat sink exchangers 108 and upstream of the heat source exchangers 106. In such an exemplary embodiment, the compressor may be driven by, e.g., an electric motor, or alternatively may be in mechanical communication with and driven by a rotary component of the turbofan engine 10, such as the HP shaft 34 or the LP shaft 36. Notably, with such a configuration, the one or more heat sink exchangers 108 (and/or the deicing module 136, discussed below) would act as a condenser, and the plurality of heat source exchangers 106 would act as an evaporator. Such a configuration may allow for efficient heat removal from the various heat source exchangers 106, and heat transfer to the one or more heat sink exchangers 108 (and/or the deicing module 136). It should also be appreciated, that in certain exemplary embodiments, the expansion device may be utilized as a power generating device configured to generate rotational power from a flow of heat exchange fluid therethrough.

As is depicted, the thermal transport bus 102 additionally includes a compressor bypass line 124 for selectively bypassing the compressor 120 and an expansion device bypass line 126 for selectively bypassing the expansion device 122. Moreover, a three-way compressor bypass valve 128 is positioned at an upstream juncture 130 for selectively bypassing the compressor 120, and similarly, a three-way expansion device bypass valve 132 is positioned at an upstream juncture 134 for selectively bypassing the expansion device 122. The three-way compressor bypass valve 128 and three-way expansion device bypass valve 132 may each be configured in substantially the same manner as the exemplary three-way heat sink valves 116 described above for bypassing operation of a respective heat sink exchanger 108.

Further, the exemplary thermal management system 100 of FIG. 2 additionally includes a fuel chiller 144 selectively in thermal communication with heat exchange fluid in the thermal transport bus 102 at a location upstream of the plurality of heat source exchangers 106 and downstream of the one or more heat sink exchangers 108. The fuel chiller 144 may be configured to remove heat from the fuel of the turbofan engine 10 to assist with maintaining the fuel within a desired temperature range. As with various other components of the thermal management system 100 of FIG. 2, the thermal management system 100 additionally includes a fuel chiller bypass line 146 for selectively bypassing the fuel chiller 144 and a three-way fuel chiller bypass valve 148. The three-way fuel chiller bypass valve 148 is located at an upstream juncture 150 and fluidly connects the thermal transport bus 102 and fuel chiller bypass line 146. The fuel chiller bypass valve 148 may be a variable throughput three-way valve configured in substantially the same manner as the exemplary three-way heat sink valves 116 described above for bypassing operation of a respective heat sink exchanger 108.

Furthermore, the exemplary thermal management system 100 of FIG. 2 includes features for heating or de-icing certain components of an aircraft and/or the turbofan engine 10. Specifically, the exemplary thermal management system 100 includes a surface heat exchange 136 in thermal communication with the heat exchange fluid in the thermal transport bus 102 at a location downstream from the one or more heat source exchangers 106 for transferring heat from the thermal transfer fluid to a surface of one or more components of the turbofan engine 10 or an aircraft (e.g., aircraft 200 of FIGS. 3 and/or 4). For the embodiment depicted, the surface heat exchange module 136 is also located upstream of the one or more heat sink exchangers 108. However, in other embodiments, the surface heat exchange module 136 may instead be located at any suitable location downstream of the one or more heat source exchangers 106. For example, in other embodiments, the surface heat exchange module 136 may be located upstream of the pump 120, or alternatively may be located downstream of one or more of the heat sink exchangers 108.

Additionally, for the embodiment depicted the thermal management system 100 additionally includes a bypass line 138 for selectively bypassing the surface heat exchange module 136. A three-way surface heat exchange module valve 140 is positioned at an upstream juncture 142 for selectively activating the surface heat exchange module 136. The three-way surface heat exchange module valve 140 may be configured in substantially the same manner as the exemplary three-way heat sink valves 116 described above for bypassing operation of a respective heat sink exchanger 108.

Depending on, e.g., the aircraft, the engine, and/or the atmospheric conditions, ice may be prone to forming on the surface of various components of the turbofan engine 10 and/or the aircraft. Accordingly, as will be explained in greater detail below, with reference to FIG. 3 and FIGS. 4 and 5, in at least certain exemplary embodiments, the surface heat exchange module 136 may be configured as a de-icing module including one or more heat exchangers for integration into a surface of one or more components of the turbofan engine 10 and/or aircraft. Notably, inclusion of a surface heat exchange/deicing module with a thermal management system may serve a dual function of deicing or heating certain components of an aircraft and/or turbofan engine, as well as removing heat from a heat exchange fluid flowing through a thermal transport bus of the thermal management system. Accordingly, such a configuration may provide for a more efficient system for deicing certain components of the turbofan engine and/or aircraft by utilizing waste heat removed from one or more other components/systems of the aircraft and/or engine.

It should be appreciated, however, that the thermal management system 100 is provided by way of example only and that in other exemplary embodiments the thermal management system 100 may be configured in any other suitable manner. For example, in other exemplary embodiments, the thermal management system 100 may not operate on a refrigeration cycle, i.e., the thermal management system 100 may not include one or both of the compressor 120 or the expansion device 122. Additionally, in other exemplary embodiments, the thermal management system 100 may not include certain other components depicted in FIG. 2, such as the fuel chiller 144. Further, in still other embodiments, the thermal management system 100 may be configured as a dedicated surface heat exchange thermal management system. Accordingly, in such a configuration, the thermal management system may not include one or more heat sink exchangers 108 in thermal communication with the heat exchange fluid in the thermal transport bus 102, and instead, the surface heat exchange module 136 may be configured as the primary means for removing heat from the heat exchange fluid in the thermal transport bus 102.

Not referring to any Figure in particular, in one exemplary embodiment of the present disclosure, the one or more heat source exchangers 106 may include, a vapor compression system (i.e., a condenser portion of the vapor compression system) and a heat exchanger from an air cycle system (configured to receive air from the turbofan engine and cool such air to be provided to the aircraft). At the hottest point, downstream of the air cycle system heat exchanger, the thermal transport bus 100 may include the surface heat exchange module 136. A portion of the heat from the thermal transport fluid may be transferred through the surface heat exchange module 136. The thermal transport bus 100 may then include a plurality of heat sink exchangers 108, such as an engine intercooler, a RAM air heat exchanger, and a cold air output of the air cycle system. Notably, the thermal transport bus 100 may additionally include a heat sink exchanger 108 located between two of the heat source exchangers 106 (e.g., a fuel system heat exchanger located between the condenser portion of the vapor compression system and the heat exchanger from the air cycle system).

Referring now to FIG. 3, a thermal management system 100 in accordance with another exemplary embodiment of the present disclosure is provided. The exemplary thermal management system 100 depicted schematically in FIG. 3 may be configured in substantially the same manner as the exemplary thermal management system 100 described above with reference to FIG. 2. Like numerals have been used in FIG. 3 to identify the same or similar components as the thermal management system 100 of FIG. 2.

For the embodiment of FIG. 3, the thermal management system 100 is incorporated into an aircraft 200 and at least partially into a gas turbine engine. The exemplary aircraft 200 depicted in FIG. 3 generally defines a longitudinal centerline 202 that extends therethrough, a lateral direction L, a forward end 204, and an aft end 206. Moreover, the aircraft 200 includes a fuselage 208, extending longitudinally from the forward end 202 of the aircraft 200 to the aft end 204 of the aircraft 200, and a pair of wings 210. A first of such wings 210 extends laterally outwardly with respect to the longitudinal centerline 14 from a port side 212 of the fuselage 208 and a second of such wings 210 extends laterally outwardly with respect to the longitudinal centerline 14 from a starboard side 214 of the fuselage 208. Each of the wings 210 for the exemplary embodiment depicted includes a leading edge 216 and a trailing edge 218. The aircraft 200 further includes a vertical stabilizer 220 having a rudder flap for yaw control, and a pair of horizontal stabilizers 222, each having an elevator flap for pitch control. The fuselage 208 additionally includes an outer surface 224. It should be appreciated however, that in other exemplary embodiments of the present disclosure, the aircraft 200 may additionally or alternatively include any other suitable configuration of stabilizer that may or may not extend directly along a vertical direction or the lateral direction L.

The exemplary aircraft 200 of FIG. 3 further includes a pair of aircraft engines, at least one of which mounted to each of the pair of wings 210. For the embodiment depicted, the aircraft engines are configured as a first turbofan jet engine 226 and a second turbofan jet engine 228, each suspended beneath the wings 210 in an under-wing configuration.

Moreover, as stated, the thermal management system 100 of FIG. 3 is integrated into the exemplary aircraft 200 and/or one or more of the turbofan engines 226, 228. As with the exemplary thermal management system 100 described above with reference to FIG. 2, the exemplary thermal management system 100 includes a thermal transport bus 102 having a heat exchange fluid flowing therethrough, along with a pump 104 for generating a flow of the heat exchange fluid in the thermal transport bus 102. Additionally, the exemplary thermal management system 100 includes one or more heat source exchangers 106 and one or more heat sink exchangers 108. The one or more heat source exchangers 106 are in thermal communication with the heat exchange fluid in the thermal transport bus 102 and the one or more heat sink exchangers 108 are permanently or selectively in thermal communication with the heat exchange fluid in a thermal transport bus 102.

Additionally, for the exemplary thermal management system 100 of FIG. 3, the one or more heat sink exchangers 108 are positioned at a location downstream of the one or more heat source exchangers 106 along the thermal transport bus 102. It should be appreciated that the thermal management system 100 of FIG. 3 is depicted schematically, and that the one or more heat source exchangers 106 in/or one or more heat sink exchangers 108 may be installed at any location within the aircraft 200 and/or the turbofan engines 226, 228. For example, in the exemplary embodiment of FIG. 3, one or more of the heat source exchangers 106 may be located in the turbofan engine 226 and one or more of the heat source exchangers 106 may be located elsewhere within the aircraft 200. Similarly, one or more of the heat sink exchangers 108 may be located in the turbofan engine 226 and one or more of the heat sink exchangers 108 may be located elsewhere within the aircraft 200.

As is also depicted in FIG. 3, the thermal management system 100 includes a surface heat exchange module 136 including one or more heat exchangers 238 (depicted in phantom) for providing heat to certain components of the aircraft 200 and/or turbofan engines 226, 228. The surface heat exchange module 136 may be configured for deicing certain surfaces of the aircraft 200 or simply heating certain surfaces of the aircraft 200.

Figure 4:
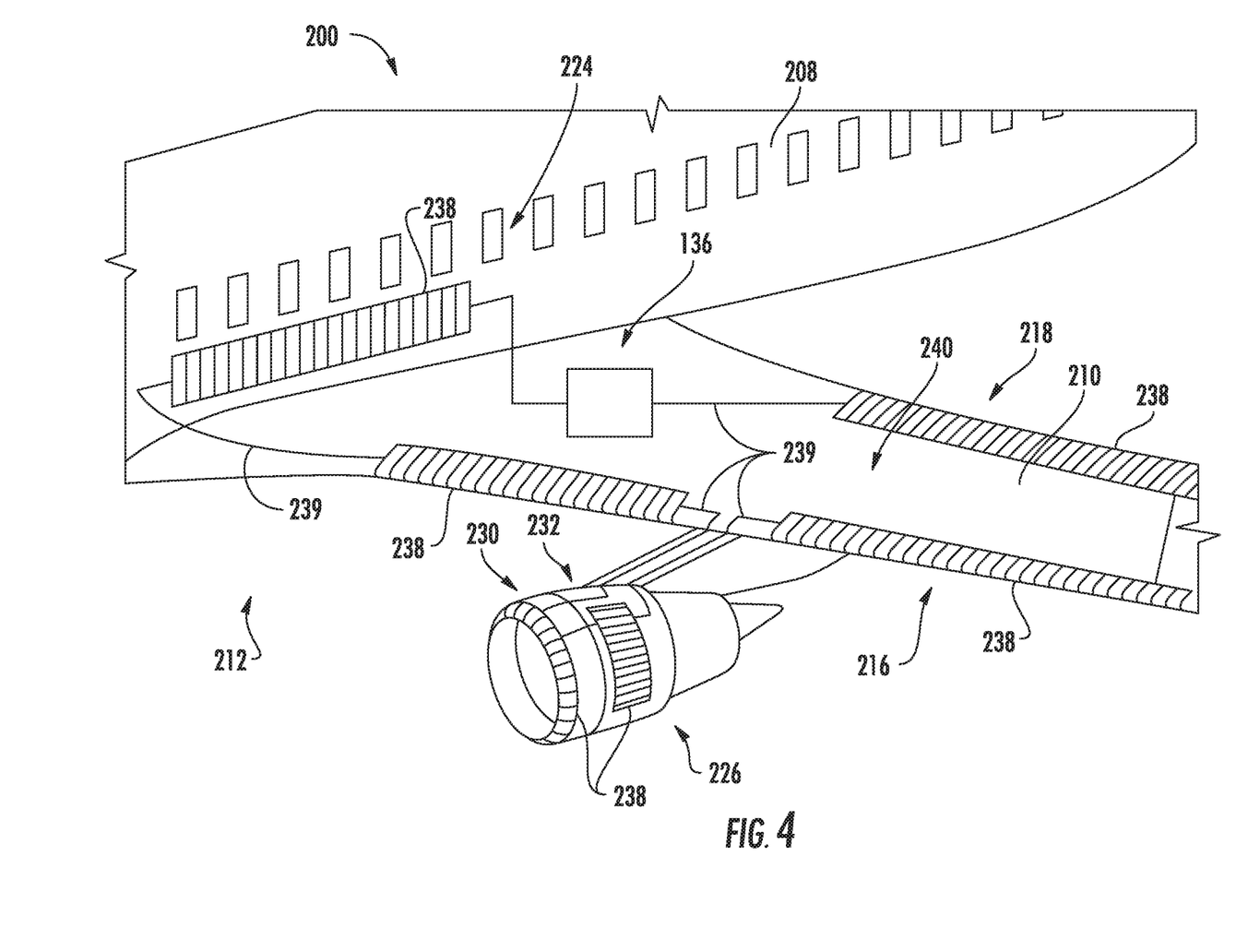
FIG. 4 is a surface heat exchange module of a thermal management system in accordance with an exemplary embodiment of the present disclosure.
Figure 5:
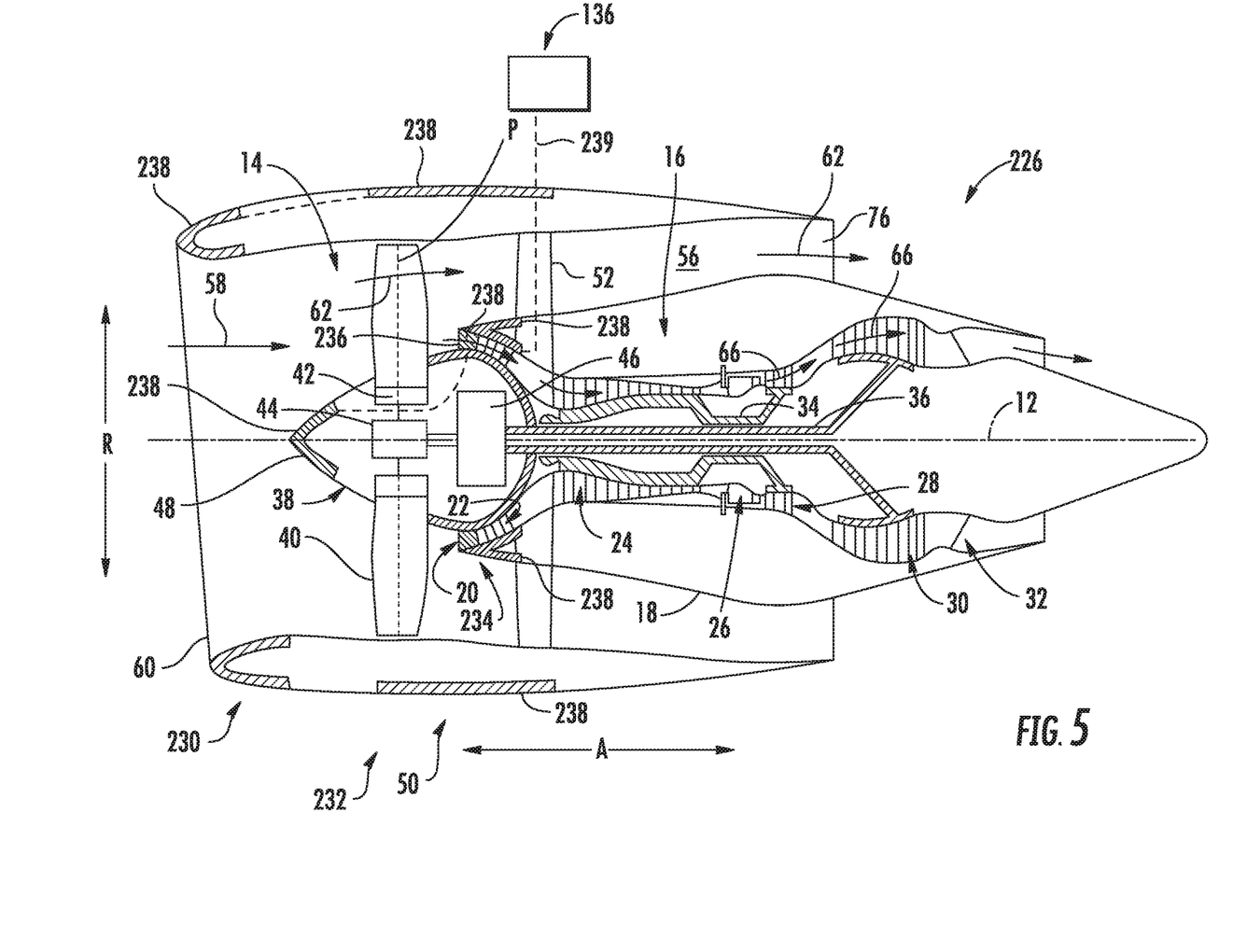
FIG. 5 is a surface heat exchange module of a thermal management system in accordance with another exemplary embodiment of the present disclosure.

Referring now to FIGS. 4 and 5, a surface heat exchange module 136 of a thermal management system 100 in accordance with an exemplary embodiment of the present disclosure is provided. More specifically, FIG. 4 provides a perspective view of a port side 212 of an aircraft 200 having the exemplary surface heat exchange module 136 of the thermal management system 100 incorporated therein, and FIG. 5 provides a side, schematic view of a turbofan engine 226 of the exemplary aircraft 200 of FIG. 4 having the exemplary surface heat exchange module 136 of the thermal management system 100 incorporated therein. Notably, although not depicted in FIGS. 4 and 5, the exemplary surface heat exchange module 136 depicted is incorporated into a thermal management system 100, such as the thermal management system 100 described above with reference to FIG. 2 and/or FIG. 3.

Moreover, the exemplary aircraft 200 of FIG. 4 may be configured in substantially the same manner as the exemplary aircraft 200 described above with reference to FIG. 3. For example, the aircraft 200 generally includes a fuselage 208 and a pair of wings 210. A first of the pair of wings 210 extends laterally outward from a starboard side 214 of the aircraft 200 (not shown) and a second of the pair of wings 210 extends laterally outward from an opposite port side 212 of the aircraft 200. The aircraft 200 may include one or more aircraft engines mounted beneath each of the pair of wings 210. For the embodiment depicted, the aircraft 200 includes the turbofan engine 226 mounted beneath the wing 210 extending outwardly from the port side 212 of the aircraft 200.

Referring now particularly to FIG. 5, the exemplary turbofan engine 226 generally defines an axial direction A (extending parallel to a longitudinal centerline 12 provided for reference), a radial direction R, and a circumferential direction (not shown). The turbofan engine 226 depicted in FIG. 5 may be configured in substantially the same manner as the exemplary turbofan engine 10 described above with reference to FIG. 1. Accordingly, the same or similar numbering may refer to same or similar components.

The exemplary turbofan engine 226 generally includes a fan section 14 and a core turbine engine 16 disposed downstream from the fan section 14. The exemplary core turbine engine 16 depicted generally includes a substantially tubular outer casing 18 that defines an annular inlet 20. The outer casing 18 encases, in serial flow relationship, a compressor section; a combustion section 26; a turbine section; and a jet exhaust nozzle section 32. A pair of shafts 34, 36 drivingly connects the compressor section to the turbine section.

For the embodiment depicted, the fan section 14 includes a fan 38 having a plurality of fan blades 40 coupled to a rotor disk 42 in a spaced apart manner. The disk 42 is covered by rotatable front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the core turbine engine 16. The outer nacelle 50 may generally include a nose cowl 230 positioned at a forward end of the nacelle 50 defining an inlet 60 to the turbofan engine 226, and a fan cowl 232 positioned aft of the nose cowl 230 and extending around/enclosing the fan 38.

During operation of the turbofan engine 226, a volume of air 58 enters the turbofan 10 through the inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into a core air flowpath 37. The volume of air 58 is separated into the first and second portions of air 62, 64 by a splitter 234 extending around the inlet 20 to the core air flowpath 37. Additionally, one or more inlet guide vanes 236 are positioned at a forward end of the core air flowpath 37, proximate the inlet 20, to direct the second flow of air 64 in a desired manner through the core air flowpath 37.

Referring still to FIGS. 4 and 5, as stated, the exemplary surface heat exchange module 136 depicted is incorporated into a thermal management system 100 in accordance with an exemplary embodiment present disclosure. Accordingly, the exemplary surface heat exchange module 136 may be in thermal communication with a heat exchange fluid in a thermal transport bus 102 at a location downstream of one or more heat source exchangers 106 of the thermal management system 100. The surface heat exchange module 136 may thus be configured for transferring heat from the thermal transfer fluid to a surface of one or more components of the turbofan engine 226 for the aircraft 200. More particularly, the exemplary surface heat exchange module 136 includes a plurality of heat exchangers 238 for integration into the surface of the one or more components of the aircraft 200, connected via a plurality of conduits 239. For example, referring particularly to FIG. 4, the exemplary surface heat exchange module 136 depicted includes a plurality of heat exchangers 238 integrated into an outside surface 240 of the wing 210 of the aircraft 200 and an outside surface 224 of a fuselage 208 of the aircraft 200. More particularly, the exemplary surface heat exchange module 136 depicted includes one or more heat exchangers 238 integrated into the surface 240 of the wing 210 at the leading edge 216 of the wing 210 on the port side 212 of the aircraft 200, the surface 240 of the wing 210 at the trailing edge 218 of the wing 210 on the port side 212 of the aircraft 200, and the surface 224 of the fuselage 208 of the aircraft 200. However, in other embodiments, the exemplary surface heat exchange module 136 may include one or more heat exchangers 238 integrated into a surface of any other component of the aircraft 200, such as a nose cone of the aircraft 200 (at the forward end 204 of the aircraft 200), or one or more stabilizers (such as the vertical stabilizer 220 or the horizontal stabilizer 222) of the aircraft 200. Alternatively, the surface heat exchange module 136 may not include one or more of the heat exchangers 238 depicted in FIG. 4.

Moreover, the exemplary surface heat exchange module 136 includes a plurality of heat exchangers 238 for integration into a surface of one or more components of the exemplary turbofan engine 226. For example, referring particularly to FIG. 5, the exemplary surface heat exchange module 136 includes a plurality of heat exchangers 238 integrated into a surface of the nose cowl 230 of the turbofan engine 226, the fan cowl 232 of the turbofan engine 226, at least one of the inlet guide vanes 236 of the turbofan engine 226, the splitter 234 of the turbofan engine 226, and the rotatable front hub 48 of the turbofan engine 226. However, in other exemplary embodiments, the surface heat exchange module 136 may include one or more heat exchangers 238 integrated into any other suitable surface of the turbofan engine 226, or alternatively, the surface heat exchange module 136 may not include one or more of the plurality of heat exchangers 238 depicted in FIGS. 4 and 5.

The plurality of heat exchangers 238 integrated into the surfaces of the various components of the turbofan engine 226 and/or the aircraft 200 may be configured for removing an amount of ice or preventing an amount of ice from forming on the respective surfaces. Accordingly, the surface heat exchange module 136 may be configured as a de-icing module. However, in other exemplary embodiments, the surface heat exchange module 136 may additionally include one or more heat exchangers integrated into various other surfaces for heating such surfaces regardless of whether or not icing is a concern. For example, the surface heat exchange module 136 may include one or more heat exchangers configured as surface heat exchangers for, e.g., one or more outlet guide vanes, fan ducts, etc.

Further, the plurality of heat exchangers 238 integrated into the surfaces of the various components of the turbofan engine 226 and/or the aircraft 200 may be configured in any suitable manner for transferring heat from a heat exchange fluid to such surface. For example, in certain exemplary embodiments, one or more of the plurality of heat exchangers 238 may include a conduit extending adjacent to an outside surface of the component to be de-iced, such that an amount of heat from a heat exchange fluid flowing therethrough transfers to such surface. Alternatively, one or more of the plurality of heat exchangers 238 may include an intermediate material configured to transfer heat from a fluid to the surface of the component to be de-iced. Alternately still, in other exemplary embodiments, one or more of the plurality of heat exchangers 238 may be integrated into the material forming the surface of the component to be de-iced.

In certain exemplary embodiments, the surface heat exchange module 136 may be configured as a closed loop module configured to transfer heat from a thermal transfer fluid (flowing through the thermal transfer bus 102 of the thermal management system 100) to a separate surface heat exchange module fluid. The deicing module fluid may then be flowed through the heat exchangers 238, connected via conduits 239, to provide heat to the desired surfaces of the various components of the aircraft 200 and/or gas turbine engine. Alternatively, in other embodiments, the surface heat exchange module 136 may be configured to receive a flow of the thermal transfer fluid (flowing through the thermal transfer bus 102 of the thermal management system 100), and flow such thermal transfer fluid to the various heat exchangers 238 configured to provide an amount of heat to the surfaces of the various components of the aircraft 200 and/or gas turbine engine. In such an exemplary embodiment, the plurality of conduits 239 may be configured as part of the thermal transport bus 102 of the thermal management system 100.

A gas turbine engine and/or aircraft including a thermal management system having a surface heat exchange module in accordance with an exemplary embodiment of the present disclosure may more efficiently perform ice prevention/removal functions. More particularly, utilizing a liquid to de-ice various components of the aircraft and/or gas turbine engine may more efficiently provide heat to such components (as compared to utilizing a bleed air). Further, utilizing heat from a thermal management systems in accordance with an exemplary embodiment of the present disclosure may add to an overall efficiency of the gas turbine engine and/or aircraft by utilizing waste heat to perform a function that may otherwise require an additional expenditure of energy.

Although not depicted, in certain exemplary embodiments, one or more of aircraft engines may have a dedicated thermal transport system and the aircraft into which the one or more of aircraft engines are installed may also have a dedicated thermal transport system. In such an exemplary embodiment, the thermal transport systems may include a common heat exchanger through which the two systems may interface and exchange heat. Accordingly, which such an exemplary embodiment, the engine thermal transport system may offload an amount of heat to aircraft thermal transport system and vice versa.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A thermal management system for incorporation at least partially into at least one of a gas turbine engine or an aircraft, the thermal management system comprising:
   a thermal transport bus having a heat exchange fluid flowing therethrough;
   a pump for generating a flow of the heat exchange fluid in the thermal transport bus;
   a plurality of heat source exchangers in thermal communication with the heat exchange fluid in the thermal transport bus;
   a surface heat exchange module in thermal communication with the heat exchange fluid in the thermal transport bus at a location downstream of the plurality of heat source exchangers for transferring heat from the heat exchange fluid to a surface of one or more components of the gas turbine engine or the aircraft; and
   a plurality of heat sink exchangers in thermal communication with the heat exchange fluid in the thermal transport bus for removing heat from the heat exchange fluid in the thermal transport bus, each heat sink exchanger of the plurality of heat sink exchangers selectively in thermal communication with the heat exchange fluid in the thermal transport bus;
   wherein the thermal transport bus is configured as a closed loop system, and wherein the surface heat exchange module is a closed loop module fluidly separate from the thermal transport bus.

2. The thermal management system of claim 1, wherein the surface heat exchange module includes one or more heat exchangers for integration into the surface of the one or more components of the gas turbine engine or the aircraft.

3. The thermal management system of claim 1, wherein the one or more components of the gas turbine engine or the aircraft include at least one of an inlet guide vane of the gas turbine engine, a nose cowl of the gas turbine engine, or a fan cowl of the gas turbine engine.

4. The thermal management system of claim 1, wherein the one or more components of the gas turbine engine or the aircraft include at least one of a wing of the aircraft or a fuselage of the aircraft.

5. The thermal management system of claim 1, wherein the plurality of heat source exchangers are arranged in series along the thermal transport bus.

6. The thermal management system of claim 1, wherein the plurality of heat source exchangers includes at least one of an environmental control system precooler, a main lubrication system heat exchanger, a generator lubrication system heat exchanger, an electronics cooling system heat exchanger, a compressor cooling air system heat exchanger, or an active clearance control system heat exchanger.

7. The thermal management system of claim 1, wherein the plurality of heat source exchangers includes at least one air to heat exchange fluid heat exchanger and at least one liquid to heat exchange fluid heat exchanger.

8. The thermal management system of claim 1, wherein the heat exchange fluid is an incompressible fluid.

9. The thermal management system of claim 1, wherein the plurality of heat source exchangers are configured to transfer heat from an accessory system of the gas turbine engine to the heat exchange fluid in the thermal transport bus.

10. The thermal management system of claim 1, further comprising a fuel chiller in thermal communication with the heat exchange fluid in the thermal transport bus.

11. The thermal management system of claim 10, wherein the fuel chiller is selectively in thermal communication with the heat exchange fluid in the thermal transport bus.

12. The thermal management system of claim 1, wherein the surface heat exchange module is configured as a de-icing module.

13. The thermal management system of claim 1, further comprising
   a fuel chiller in thermal communication with the heat exchange fluid in the thermal transport bus at a location upstream of the plurality of heat source exchangers.

14. A gas turbine engine comprising:
   a compressor section coupled to a turbine section by one or more shafts;
   a main lubrication system for providing lubrication to one or more components located in at least one of the compressor section or the turbine section; and
   a thermal management system including
      a thermal transport bus having a heat exchange fluid flowing therethrough;
      a pump for generating a flow of the heat exchange fluid in the thermal transport bus;
      a plurality of heat source exchangers in thermal communication with the heat exchange fluid in the thermal transport bus, the plurality of source exchangers including a main lubrication heat exchanger in thermal communication with the main lubrication system;
      a surface heat exchange module in thermal communication with the heat exchange fluid in the thermal transport bus at a location downstream of the plurality of heat source exchangers for transferring heat from the heat exchange fluid to a surface of one or more components of the gas turbine engine; and
      a plurality of heat sink exchangers in thermal communication with the heat exchange fluid in the thermal transport bus for removing heat from the heat exchange fluid in the thermal transport bus, each heat sink exchanger of the plurality of heat sink exchangers selectively in thermal communication with the heat exchange fluid in the thermal transport bus;

wherein the thermal transport bus is configured as a closed loop system, and wherein the surface heat exchange module is a closed loop module fluidly separate from the thermal transport bus.

15. The gas turbine engine of claim 14, wherein the surface heat exchange module includes one or more heat exchangers for integration into the surface of the one or more components of the gas turbine engine or the aircraft.

16. The gas turbine engine of claim 14, wherein the one or more components of the gas turbine engine or the aircraft include at least one of an inlet guide vane of the gas turbine engine, a nose cowl of the gas turbine engine, or a fan cowl of the gas turbine engine.

17. The gas turbine engine of claim 14, wherein the plurality of heat source exchangers are arranged in series along the thermal transport bus.

18. The gas turbine engine of claim 14, wherein the plurality of heat source exchangers additionally includes at least one of an environmental control system precooler, a generator lubrication system heat exchanger, an electronics cooling system heat exchanger, a compressor cooling air system heat exchanger, or an active clearance control system heat exchanger.

19. A thermal management system for incorporation at least partially into at least one of an aircraft or a propulsion engine of the aircraft, the thermal management system comprising:

a thermal transport bus having a heat exchange fluid flowing therethrough;

a pump for generating a flow of the heat exchange fluid in the thermal transport bus;

a plurality of heat source exchangers in thermal communication with the heat exchange fluid in the thermal transport bus;

a surface heat exchange module in thermal communication with the heat exchange fluid in the thermal transport bus at a location downstream of the plurality of heat source exchangers for transferring heat from the heat exchange fluid to a surface of one or more components of the propulsion engine or the aircraft; and a plurality of heat sink exchangers in thermal communication with the heat exchange fluid in the thermal transport bus for removing heat from the heat exchange fluid in the thermal transport bus, each heat sink exchanger of the plurality of heat sink exchangers selectively in thermal communication with the heat exchange fluid in the thermal transport bus;

wherein the thermal transport bus is configured as a closed loop system, and wherein the surface heat exchange module is a closed loop module, and wherein the surface heat exchange module is configured to transfer heat from the heat exchange fluid flowing through the thermal transport bus to a separate surface heat exchange module fluid.

20. The thermal management system of claim 19, further comprising a fuel chiller.

* * * * *